(12) United States Patent
Wu (10) Patent No.: US 12,038,144 B1
(45) Date of Patent: Jul. 16, 2024

(54) INTEGRATED DUAL-COLOR VEHICLE LIGHT DEVICE

(71) Applicant: COPLUS INC., Tainan (TW)

(72) Inventor: Po-Hua Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 18/382,571

(22) Filed: Oct. 23, 2023

(30) Foreign Application Priority Data

Aug. 2, 2023 (TW) ................................. 112128970

(51) Int. Cl.
*F21S 41/148* (2018.01)
*F21S 41/27* (2018.01)
*F21S 41/33* (2018.01)
*F21S 41/43* (2018.01)

(52) U.S. Cl.
CPC ............. *F21S 41/148* (2018.01); *F21S 41/27* (2018.01); *F21S 41/33* (2018.01); *F21S 41/43* (2018.01)

(58) Field of Classification Search
CPC .......... F21S 41/148; F21S 41/33; F21S 41/27; F21S 41/43
See application file for complete search history.

(56) References Cited

U.S. PATENT DOCUMENTS 7,144,131 B2 * 12/2006 Rains ........................ F21V 7/26
362/231
8,814,405 B2 * 8/2014 Takahashi ............. F21S 41/675
362/231

10,066,809 B2 * 9/2018 Takahira ................ H01S 5/0087
11,770,883 B1 * 9/2023 Wu ......................... F21S 41/148
362/545
2004/0070989 A1 * 4/2004 Amano ................. G02B 6/0036
362/520
2006/0285341 A1 * 12/2006 Yatsuda ................ F21S 41/155
257/E33.072
2009/0231874 A1 * 9/2009 Kishimoto ............... B60Q 1/04
977/902
2009/0310377 A1 * 12/2009 Kanai ................. G02B 27/0927
362/538
2013/0027951 A1 * 1/2013 Takahashi .......... G02B 19/0061
362/543

(Continued)

FOREIGN PATENT DOCUMENTS

CN 110107861 A 8/2019
TW M576228 U 4/2019
TW 202020366 A 6/2020

*Primary Examiner* — Bryon T Gyllstrom
(74) *Attorney, Agent, or Firm* — Li & Cai Intellectual Property (USA) Office (57) ABSTRACT

An integrated dual-color vehicle light device includes a vehicle light source module and a vehicle light optical assembly. The vehicle light source module includes a substrate and a plurality of light-emitting units. The light-emitting units are disposed on the substrate and spaced apart from each other. Each of the light-emitting units has a light-emitting surface. A minimum separation distance is defined between the light-emitting surfaces of any two adjacent ones of the light-emitting units, and is less than or equal to 0.3 millimeters. The light-emitting units can jointly emit a first light source and a second light source that have different chromaticities. The vehicle light optical assembly can reflect or refract the first light source and the second light source.

11 Claims, 10 Drawing Sheets

(56) References Cited

U.S. PATENT DOCUMENTS

2014/0022804 A1\* 1/2014 Konishi ................ F21S 41/322
                                                    362/516
2022/0154905 A1\* 5/2022 Ichikawa .............. F21S 41/143

\* cited by examiner

INTEGRATED DUAL-COLOR VEHICLE LIGHT DEVICE

CROSS-REFERENCE TO RELATED PATENT APPLICATION

This application claims the benefit of priority to Taiwan Patent Application No. 112128970, filed on Aug. 2, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a vehicle light device, and more particularly to an integrated dual-color vehicle light device.

BACKGROUND OF THE DISCLOSURE

In order to ensure good visibility under different weather conditions, vehicles can be equipped with white headlights suitable for regular weather and amber headlights suitable for inclement weather. However, conventional headlight devices can only emit light of a single color. As such, vehicles need to be installed with both white and amber headlight devices, so as to have dual-color light switching functionality. Furthermore, the space available for installation of vehicle headlights is limited. When a vehicle is installed with both the white and amber headlight devices, the maximum brightness of either the white or amber light emitted by the vehicle will be noticeably less than the maximum brightness achieved by a vehicle equipped with two white headlight devices or two yellow headlight devices, thereby negatively affecting driving safety.

SUMMARY OF THE DISCLOSURE

In response to the above-referenced technical inadequacies, the present disclosure provides an integrated dual-color vehicle light device.

In order to solve the above-mentioned problems, one of the technical aspects adopted by the present disclosure is to provide an integrated dual-color vehicle light device. The integrated dual-color vehicle light device includes a vehicle light source module and a vehicle light optical assembly. The vehicle light source module includes a substrate and a plurality of light-emitting units. The light-emitting units are disposed on the substrate and spaced apart from each other. Each of the light-emitting units has a light-emitting surface, a minimum separation distance is defined between the light-emitting surfaces of any two adjacent ones of the light-emitting units, and the minimum separation distance is less than or equal to 0.3 millimeters. Certain ones of the light-emitting units are configured to jointly emit a first light source, and other ones of the light-emitting units are configured to jointly emit a second light source. A chromaticity of the first light source is different from a chromaticity of the second light source. The chromaticity of the first light source is within a first chromaticity region of a CIE-xy chromaticity diagram, and the first chromaticity region is a region enclosed by a plurality of functional straight lines of $X=0.31$, $Y=0.44$, $X=0.5$, $Y=0.38$, $Y=0.15+0.64X$, and $Y=0.05+0.75X$. The chromaticity of the second light source is within a second chromaticity region of a CIE-xy chromaticity diagram, and the second chromaticity region is a region enclosed by a plurality of functional straight lines of $Y=1.290X-0.1$, $Y=0.138+0.58X$, $Y=0.44$, and $Y=0.94-X$. The vehicle light optical assembly is disposed on one side of the vehicle light source module. The vehicle light optical assembly is configured to reflect or refract the first light source and the second light source of the light-emitting units, so that the first light source and the second light source are configured to respectively produce a first light path region and a second light path region via the vehicle light optical assembly, and the first light path region overlaps with the second light path region by at least 70% or more.

Therefore, in the integrated dual-color vehicle light device provided by the present disclosure, by virtue of "a minimum separation distance being defined between the light-emitting surfaces of any two adjacent ones of the light-emitting units, and the minimum separation distance being less than or equal to 0.3 millimeters," "the chromaticity of the first light source being within a first chromaticity region of a CIE-xy chromaticity diagram, and the chromaticity of the second light source being within a second chromaticity region of the CIE-xy chromaticity diagram," and "the vehicle light optical assembly being configured to reflect or refract the first light source and the second light source of the light-emitting units, so that the first light source and the second light source are configured to respectively produce a first light path region and a second light path region via the vehicle light optical assembly, and the first light path region overlaps with the second light path region by at least 70% or more," the integrated dual-color vehicle light device can selectively emit lights of two different chromaticities (i.e., white light and amber light) that comply with safety regulations, and can also ensure light of any chromaticity to be emitted at the maximum irradiation brightness that is achievable for a vehicle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
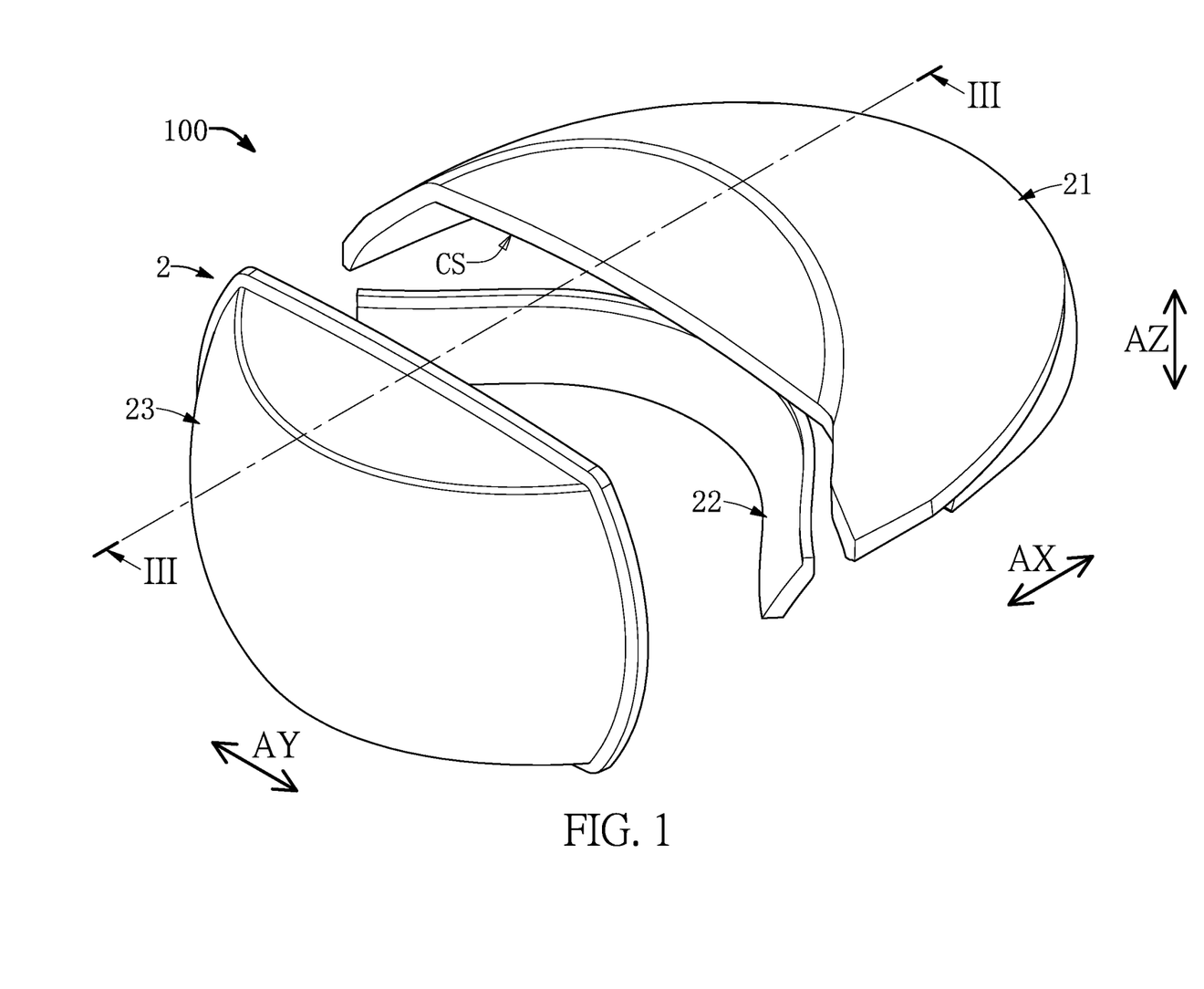
FIG. 1 is a schematic perspective view of an integrated dual-color vehicle light device according to the present disclosure.
Figure 2:
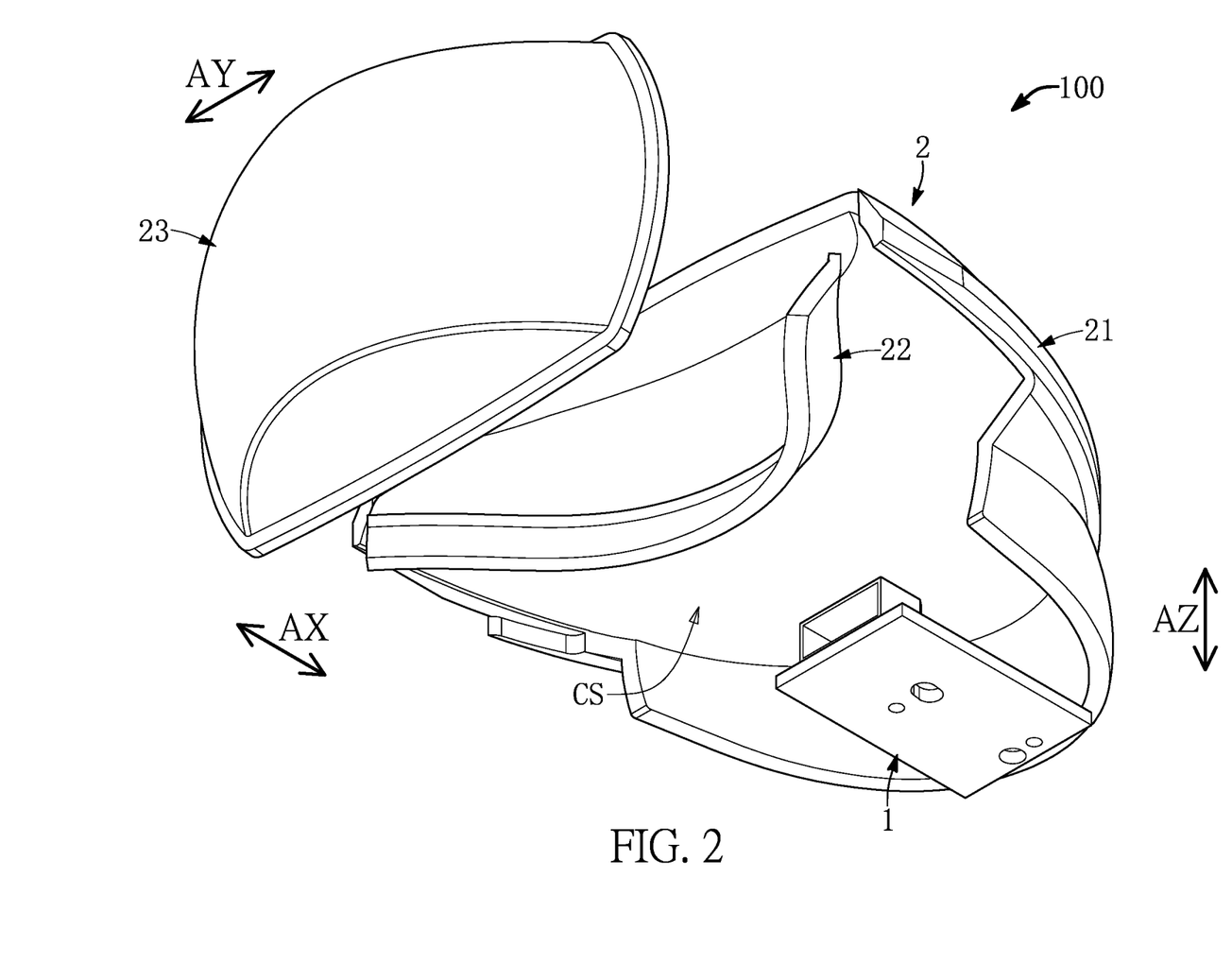
FIG. 2 is another schematic perspective view of the integrated dual-color vehicle light device according to the present disclosure.
Figure 3:
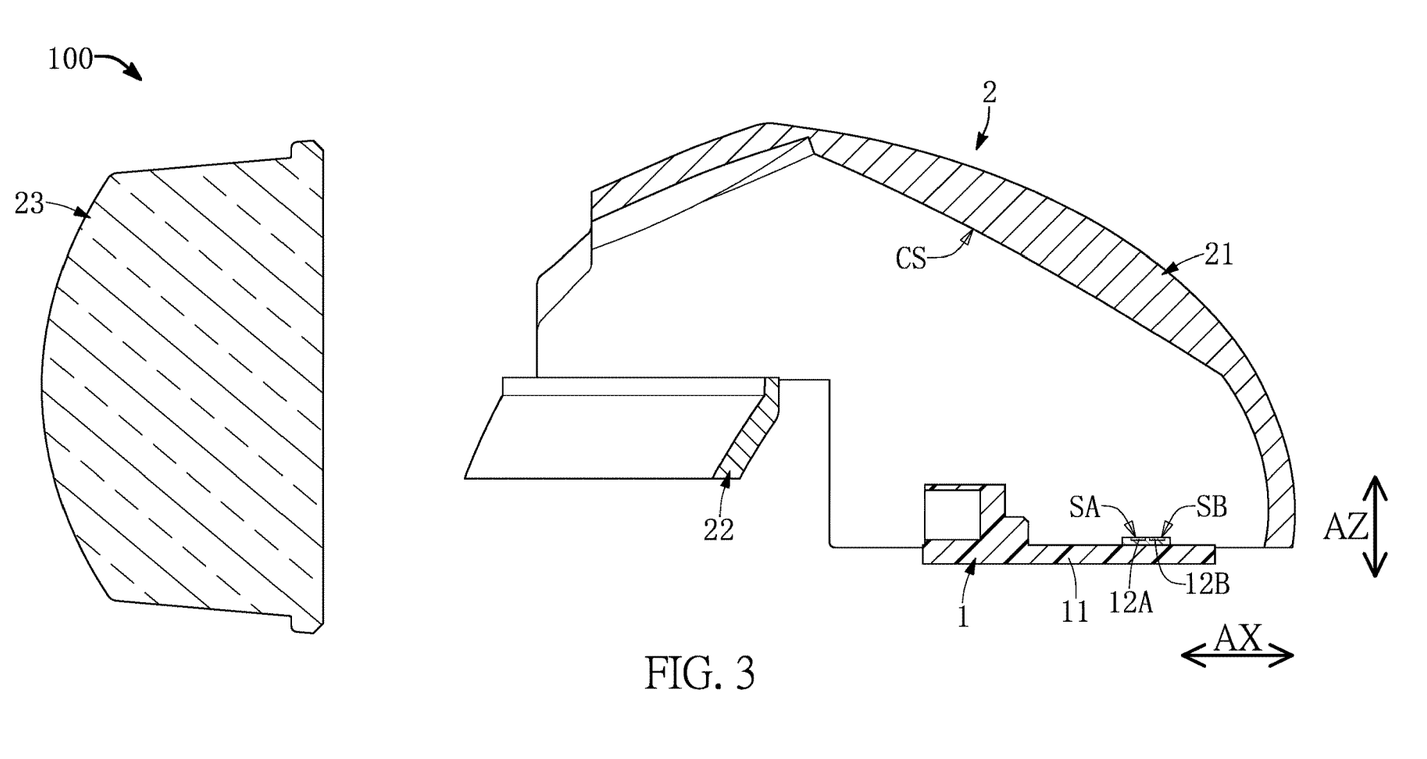
FIG. 3 is a schematic cross-sectional view taken along line III-III of FIG. 1.

Referring to FIG. 1 to FIG. 10, the present disclosure provides an integrated dual-color vehicle light device 100. As shown in FIG. 1 to FIG. 3, the integrated dual-color vehicle light device 100 includes a vehicle light source module 1 and a vehicle light optical assembly 2 that is disposed on one side of the vehicle light source module 1. The integrated dual-color vehicle light device 100 can selectively emit a first light source and a second light source that have different chromaticities via the vehicle light source module 1, so that the first light source and the second light source further illuminate in a predetermined direction through the vehicle light optical assembly 2. In this way, according to weather conditions, a driver (or a vehicle computer) can choose to use either the first light source or the second light source as a driving light source of a vehicle.

In other words, any vehicle light device that does not emit light sources of two different chromaticities from one single vehicle light source module 1 is not the integrated dual-color vehicle light device 100 of the present disclosure. The following description describes the structure and connection relation of each component of the integrated dual-color vehicle light device 100.

Referring to FIG. 1 to FIG. 3, the vehicle light source module 1 includes a substrate 11 and a plurality of light-emitting units (i.e., 12A and 12B in FIG. 4) disposed on the substrate 11. In the present embodiment, the substrate 11 has a port, and the port can be connected by a connection line (not shown), so that the light-emitting units can receive power and control signals and can be controlled.

Figure 4:
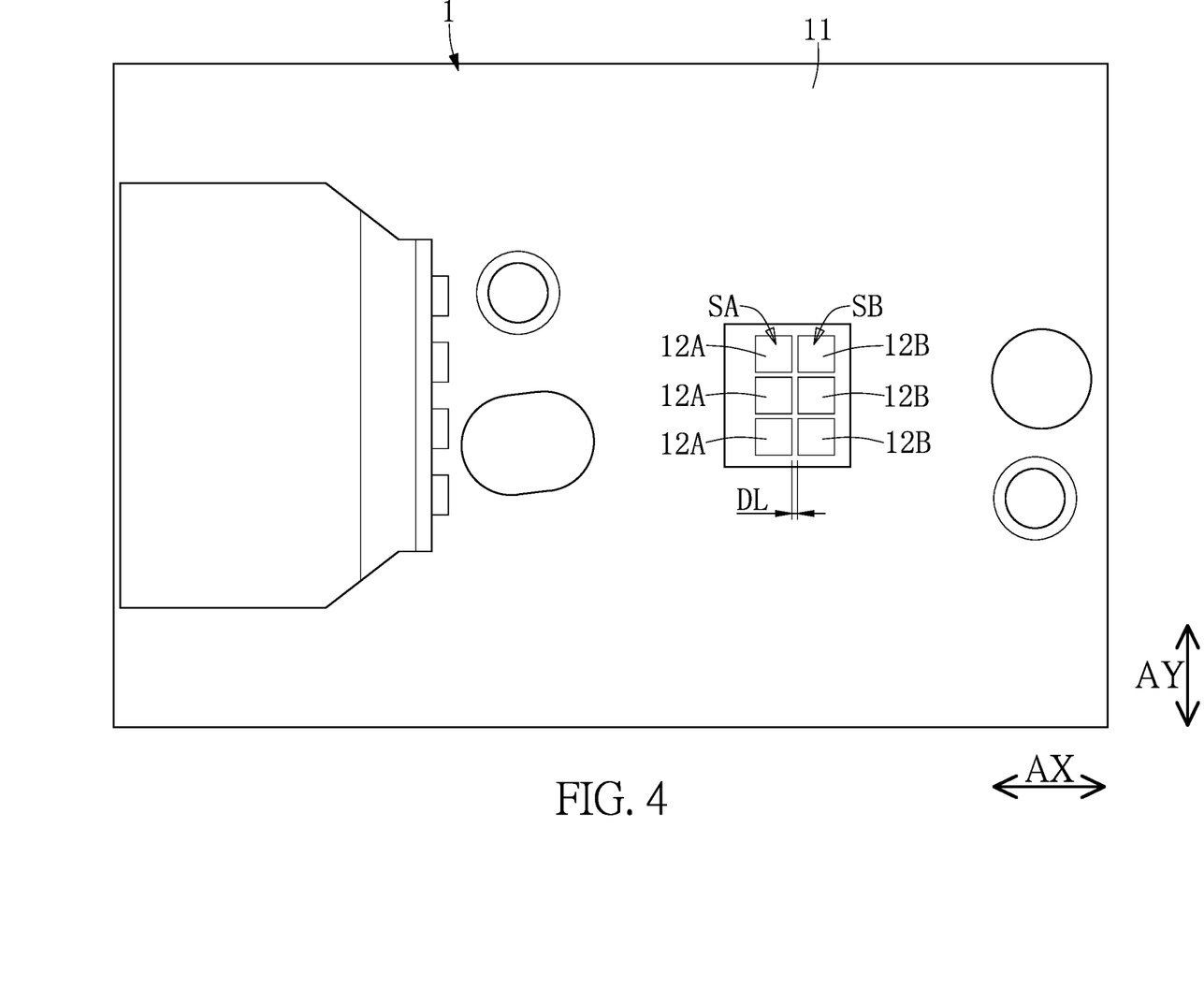
FIG. 4 is a schematic top view of the integrated dual-color vehicle light device according to the present disclosure.
Figure 10:
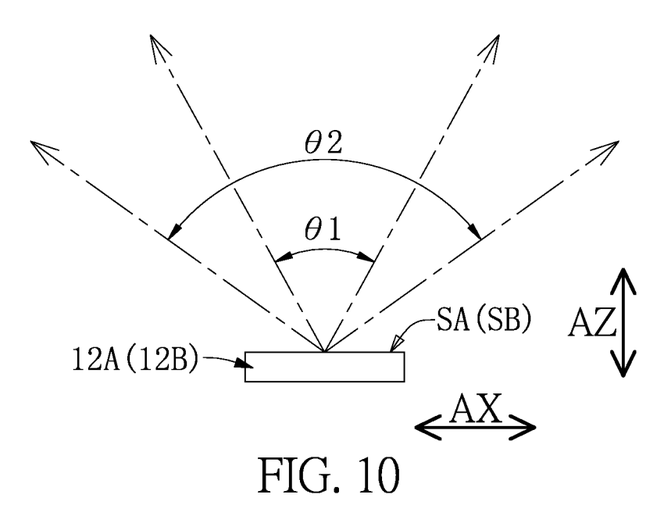
FIG. 10 is a schematic view of a light emission angle of each of the first light-emitting units or the second light-emitting units according to the present disclosure.

Referring to FIG. 4 and FIG. 10, the light-emitting units in the present embodiment are a plurality of light-emitting diodes that emit light from top surfaces thereof, and the light-emitting units are spaced apart from each other on the substrate 11. In other words, the top surface of each of the light-emitting units is a light-emitting surface (i.e., SA, SB in FIG. 4). Moreover, a minimum separation distance DL is defined between the light-emitting surfaces of any two adjacent ones of the light-emitting units, and the minimum separation distance DL is less than or equal to 0.3 millimeters. Certain ones of the light-emitting units are configured to jointly emit a first light source, and other ones of the light-emitting units are configured to jointly emit a second light source, so that light-emitting positions of the first light source and the second light source can be consistent.

Figure 5:
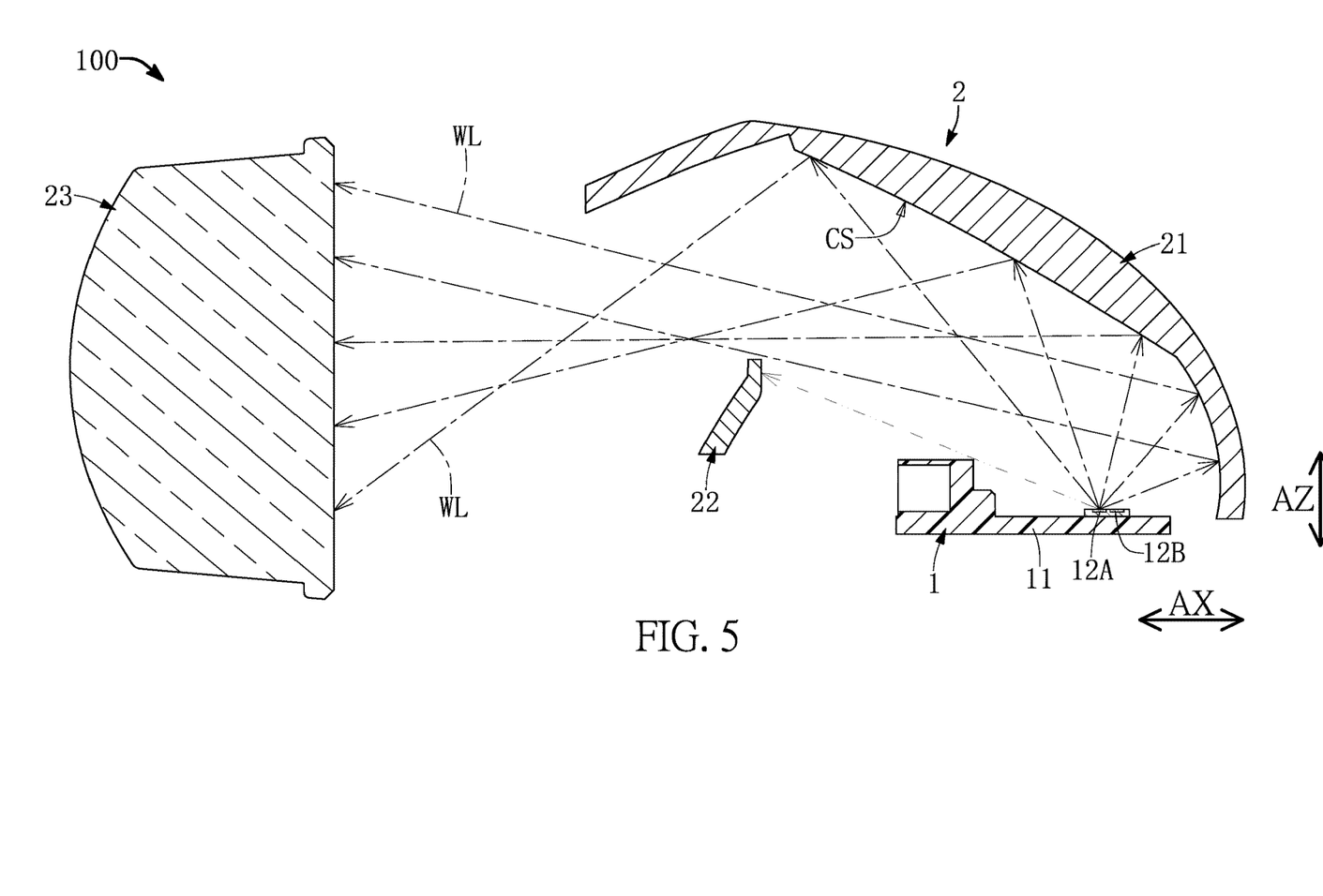
FIG. 5 is a schematic view showing an optical path of each of first light-emitting units according to the present disclosure.
Figure 6:
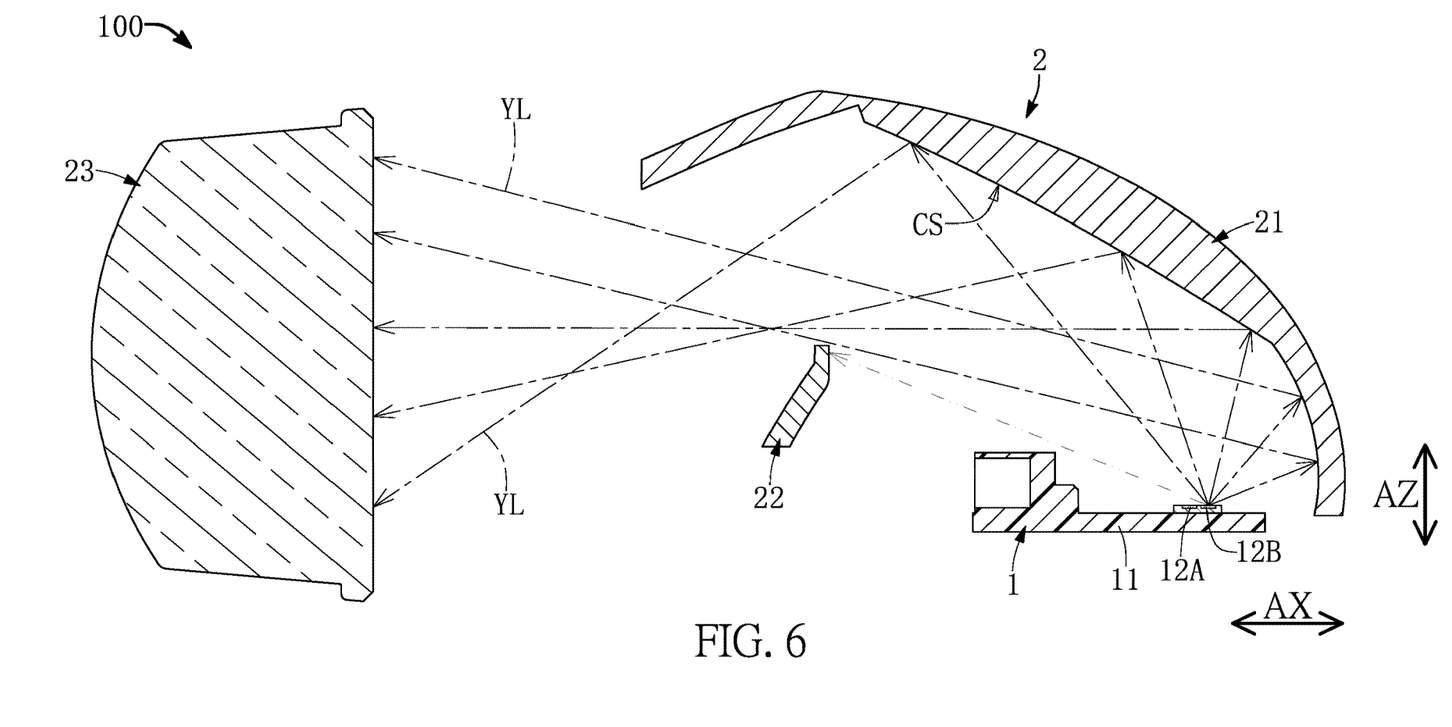
FIG. 6 is a schematic view showing an optical path of each of second light-emitting units according to the present disclosure.

It should be noted that a chromaticity of the first light source of the integrated dual-color vehicle light device 100 must be different from a chromaticity of the second light source of the integrated dual-color vehicle light device 100, and the first light source and the second light source in the present embodiment are respectively described as white light and amber light. Therefore, the certain ones of the light-emitting units are each chosen to be a white LED and defined as a first light-emitting unit 12A. Each of the first light-emitting units 12A can emit a first light beam WL that is white light via the light-emitting surface (as shown in FIG. 5). The other ones of the light-emitting units are each chosen to be an amber LED and defined as a second light-emitting unit 12B. Each of the second light-emitting units 12B can emit a second light beam YL that is amber light via the light-emitting surface (as shown in FIG. 6).

In a practical application, the first light beams WL emitted by the first light-emitting units 12A can jointly form the first light source. That is, the first light source is formed by white lights that are similar or equivalent in chromaticity. The second light beams YL emitted by the second light-emitting units 12B can jointly form the second light source. That is, the second light source is formed by amber lights that are similar or equivalent in chromaticity. However, the present disclosure is not limited thereto.

For example, the second light beams YL emitted by the second light-emitting units 12B can also cooperate with the first light beam WL emitted by at least one of the first light-emitting units 12A to jointly form the second light source. That is, the second light source is formed by mixing the amber light and the white light that are significantly different in chromaticity.

Figure 7:
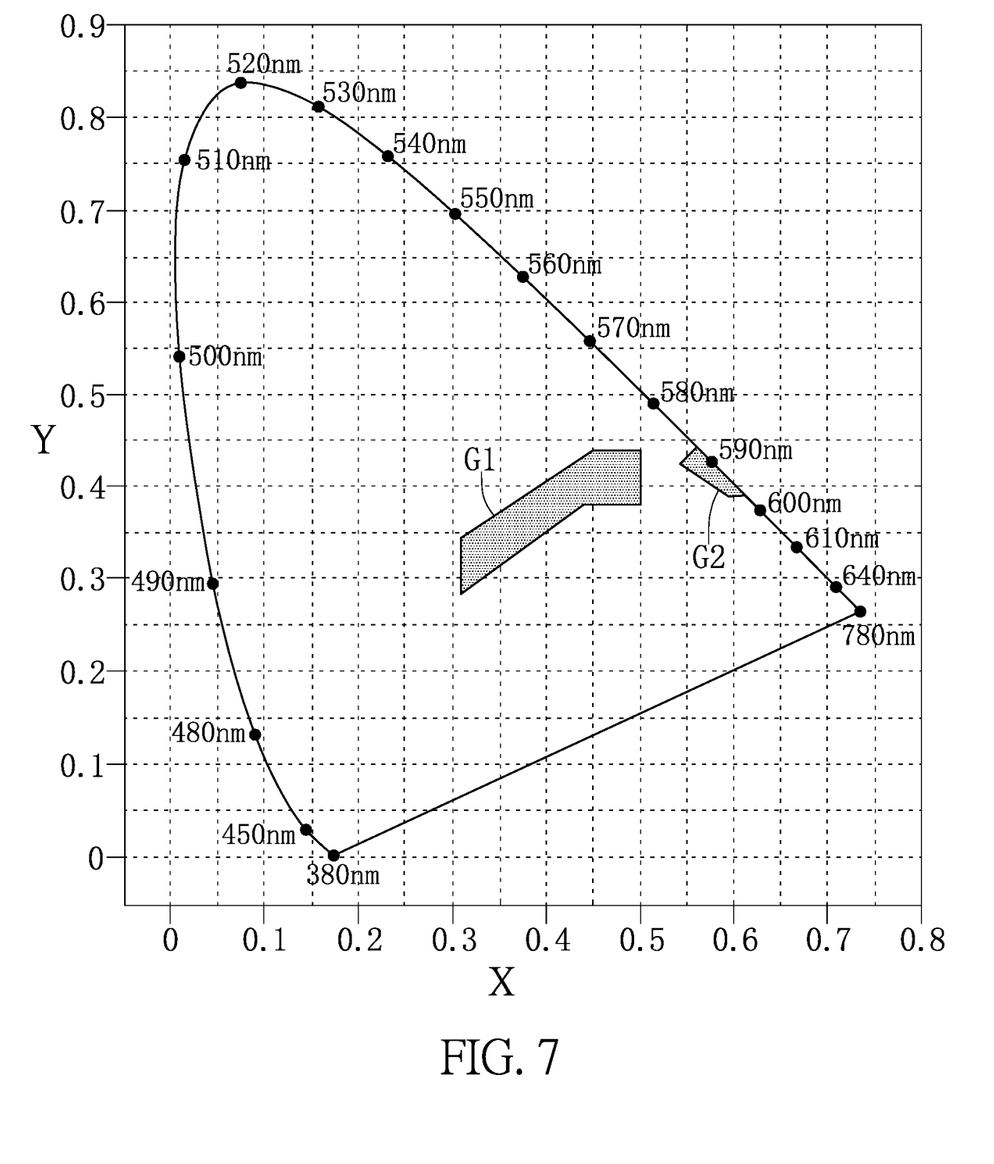
FIG. 7 is a schematic diagram showing a first chromaticity region of a first light source and a second chromaticity region of a second light source of a CIE-xy chromaticity diagram according to the present disclosure.
Figure 8:
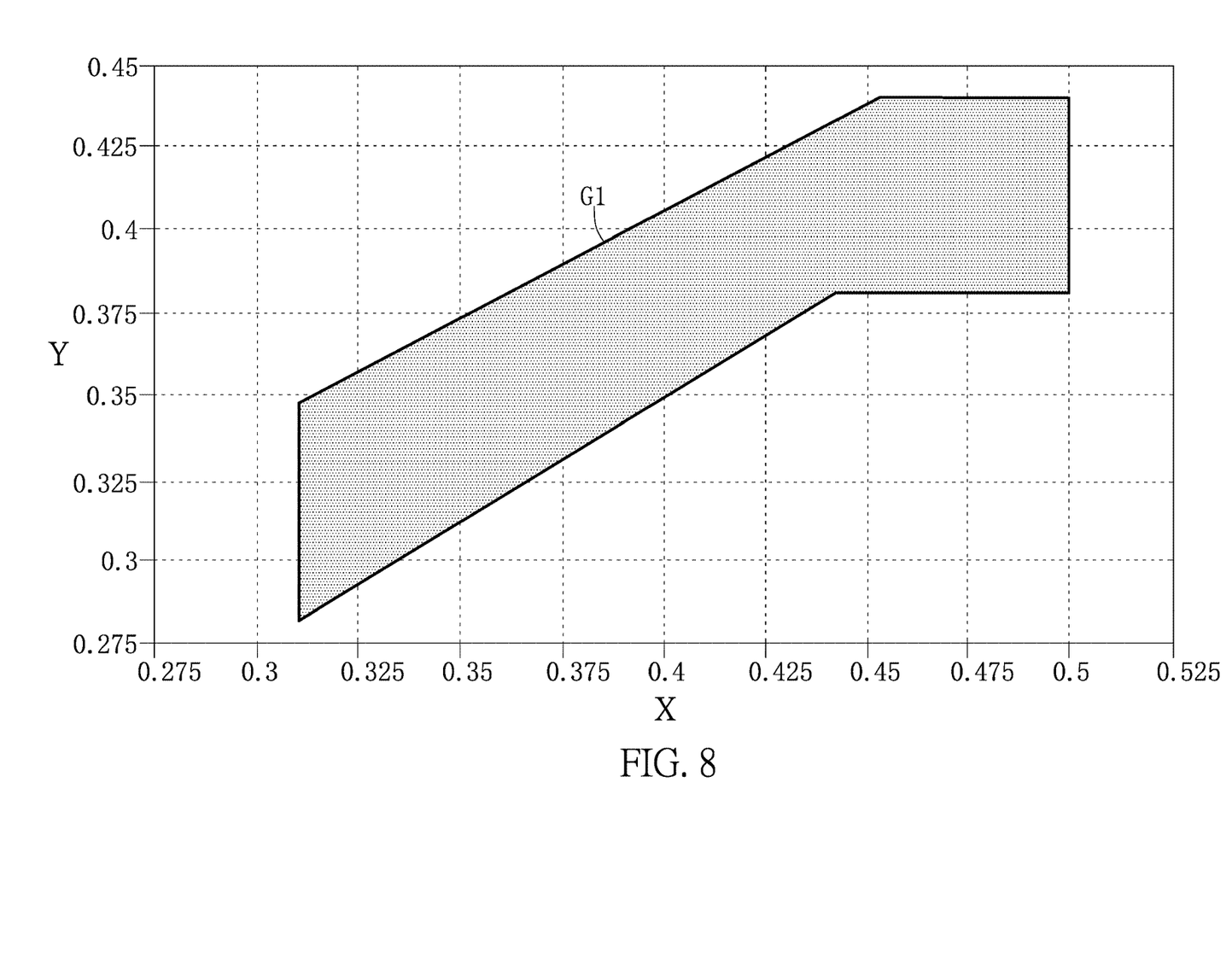
FIG. 8 is a schematic diagram showing the first chromaticity region of the first light source of the CIE-xy chromaticity diagram according to the present disclosure.
Figure 9:
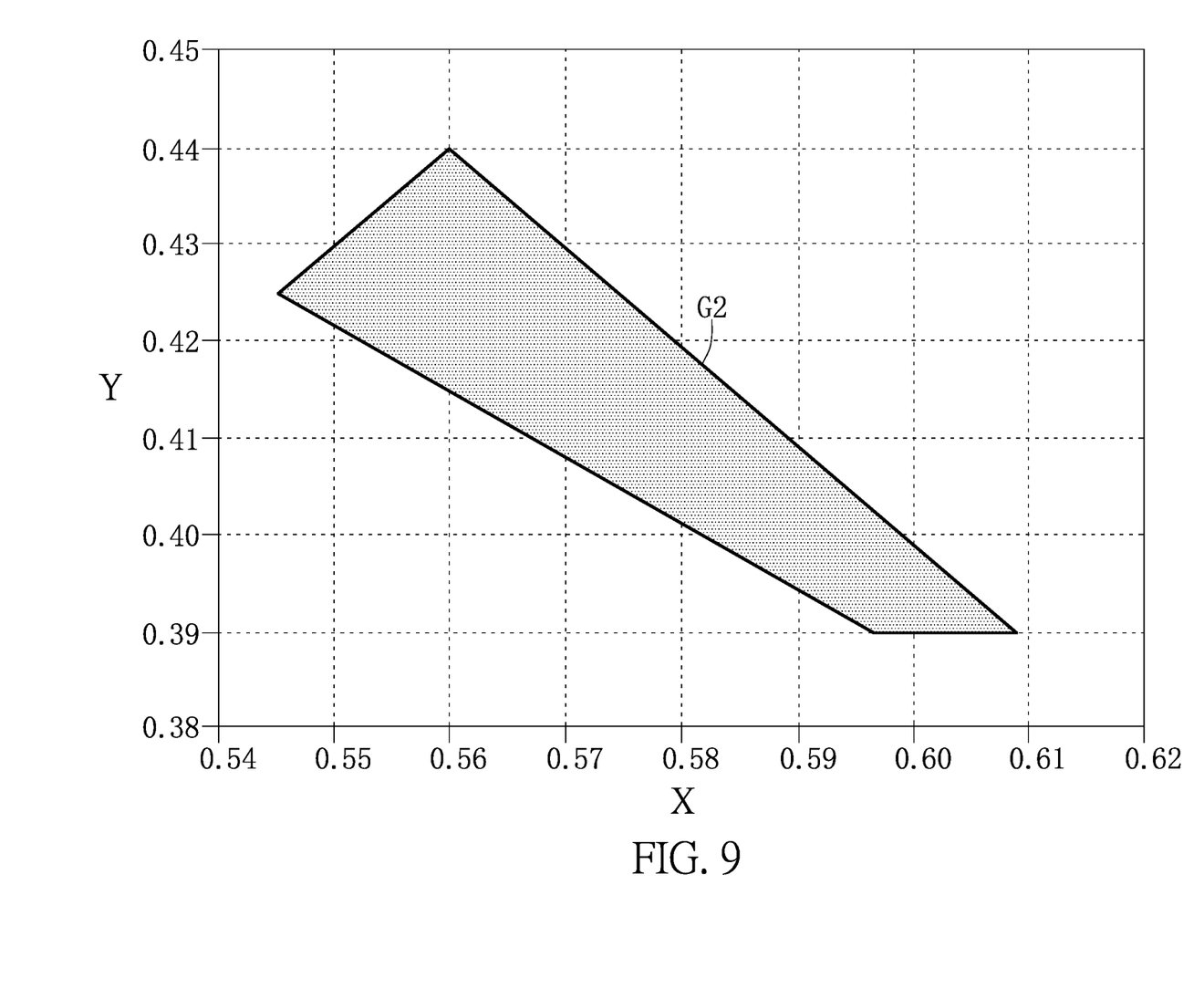
FIG. 9 is a schematic diagram showing the second chromaticity region of the second light source of the CIE-xy chromaticity diagram according to the present disclosure.

It should be noted that, as shown in FIG. 7 to FIG. 9, the chromaticity of the first light source is within a first chromaticity region G1 of the CIE-xy chromaticity diagram, and the first chromaticity region G1 is a region enclosed by a plurality of functional straight lines of X=0.31, Y=0.44, X=0.5, Y=0.38, Y=0.15+0.64X, and Y=0.05+0.75X. In other words, the first chromaticity region G1 is a hexagonal region surrounded by six straight lines (as shown in FIG. 7 and FIG. 8). In addition, the chromaticity of the second light source is within a second chromaticity region G2 of the CIE-xy chromaticity diagram, and the second chromaticity region G2 is a region enclosed by a plurality of functional straight lines of Y=1.290X−0.1, Y=0.138+0.58X, Y=0.44, and Y=0.94−X. In other words, the second chromaticity region G2 is a quadrilateral region surrounded by four straight lines (as shown in FIG. 7 and FIG. 9).

Referring to FIG. 4 to FIG. 6, the vehicle light optical assembly 2 is disposed on one side of the vehicle light source module 1. The vehicle light optical assembly 2 is configured to reflect or refract the first light source and the second light source of the light-emitting units, so that the first light source and the second light source are configured to respectively produce a first light path region and a second light path region via the vehicle light optical assembly 2, and the first light path region overlaps with the second light path region by at least 70% or more.

In order to facilitate subsequent explanation, the vehicle light optical assembly 2 is defined to have a length direction AX, a width direction AY perpendicular to the length direction AX, and a height direction AZ that is perpendicular to the length direction AX and the width direction AY. The length direction AX in the present embodiment is a left-right direction as illustrated in FIG. 3 and is generally parallel to light emission paths of the first light source and the second light source. The following description describes the structure and connection relation of each component of the vehicle light optical assembly 2.

Referring to FIG. 1 to FIG. 3, the vehicle light optical assembly 2 in the present embodiment includes a reflective element 21, a light pattern adjustment element 22, and a collimating lens 23. The reflective element 21 has a curved surface CS that faces toward the substrate 11. A region defined by orthogonally projecting the curved surface CS toward the substrate 11 (along the height direction AZ) covers a region defined by orthogonally projecting the light-emitting units toward the substrate 11, so that the first light source and the second light source are configured to be reflected by the reflective element 21. That is to say, a portion of the curved surface CS covers the vehicle light source module 1 to reflect light.

The light pattern adjustment element 22 is disposed on one side of the substrate 11. A portion of the light pattern adjustment element 22 is covered by the region defined by orthogonally projecting the curved surface CS toward the substrate 11 (along the height direction AZ), and the light pattern adjustment element 22 can block certain ones of the first light source and the second light source reflected by the reflective element 21. In other words, another portion of the curved surface CS also covers the light pattern adjustment element 22.

Preferably, a cross-section of the light pattern adjustment element 22 along the width direction AY is in a C-shape and has a center of curvature (not labeled) that is located on a side of the light pattern adjustment element 22 facing the collimating lens 23. Accordingly, the light pattern adjustment element 22 can change a position of the center of curvature in the height direction AZ and the length direction AX by way of pivoting, so as to partially block the first light source and the second light source for correction of a light pattern of the collimating lens 23.

Referring to FIG. 5 and FIG. 6, the collimating lens 23 is located on a side of the light pattern adjustment element 22 away from the vehicle light source module 1 (along the length direction AX), and the collimating lens 23 is not located in a path region defined by orthogonally projecting the reflective element 21 along the height direction AZ. A path defined by orthogonally projecting the collimating lens 23 toward the reflective element 21 covers the light pattern adjustment element 22 and the vehicle light source module 1, and the collimating lens 23 can refract the first light source and the second light source reflected by the reflective element 21, so that the first light source and the second light source finally illuminate a predetermined region.

In order to ensure that the chromaticities of the first light source and the second light source that finally illuminate the predetermined region remain within the first chromaticity region G1 and the second chromaticity region G2, an aluminum plating layer (not shown) is disposed on the curved surface CS of the reflective element 21, and a reflectivity of the aluminum plating layer is preferably within a range from 80% to 90%. Moreover, a light transmittance of the collimating lens 23 is preferably within a range from 85% to 95%, and a refractive index of the collimating lens 23 is preferably within a range from 1.3 to 1.6.

It should be noted that, in practice, the light-emitting units that emit amber light and white light cannot achieve identical light paths by being stacked on top of each other. Furthermore, when the amber light and the white light undergo reflection, refraction, or light shaping through the vehicle light optical assembly 2, the energy of the light source (i.e., the first light source or the second light source) that ultimately illuminates the road may be affected, thereby causing the chromaticity of the light source to not meet safety standards.

Therefore, the minimum separation distance DL between the light-emitting units in the present disclosure is designed to be less than or equal to 0.3 millimeters, so that the first light source and the second light source emitted by the light-emitting units can be closely arranged or concentrated. Furthermore, an overlap between the first light path region and the second light path region that are respectively produced by the first light source and the second light source after passing through the vehicle light optical assembly 2 is at least 70% or more. Taking the design of the "minimum separation distance DL" and "the overlap between the first light path region and the second light path region being at least 70% or more" for the aforementioned first light source and second light source into consideration, the chromaticity of the first light source and the chromaticity of the second light source are further designed to be limited within the first chromaticity region and the second chromaticity region. In this way, when the first light source and the second light source (with their energy being affected) leave the vehicle light optical assembly 2, their respective chromaticities can meet safety regulations and standards.

In order to ensure that the first light source and the second light source can conform more closely to the safety regulations and standards, the first light-emitting units 12A are preferably arranged on one side of the substrate 11 that is adjacent to the collimating lens 23 and along the width direction AY, and the second light-emitting units 12B are preferably arranged on another side of the substrate 11 that is away from the collimating lens 23 and along the width direction AY. In other words, as shown in FIG. 4, the first light-emitting units 12A and the second light-emitting units 12B are arranged in a matrix configuration (e.g., a 3×2 matrix), the first light-emitting units 12A are located in a first row (e.g., the first light-emitting units 12A are located at $M_{11}$, $M_{12}$, $M_{13}$), and the second light-emitting units 12B are located in a second row (e.g., the second light-emitting units 12B are located at $M_{21}$, $M_{22}$, $M_{23}$), but the present disclosure is not limited thereto. For example, in another embodiment of the present disclosure (not shown), the first light-emitting units 12A and the second light-emitting units 12B can also be arranged in an alternating pattern (e.g., the first light-emitting units 12A are located at $M_{11}$, $M_{22}$, $M_{13}$, and the second light-emitting units 12B are located at $M_{21}$, $M_{12}$, $M_{23}$).

In addition, referring to FIG. 5, FIG. 6, and FIG. 10, due to the relative positional relationship between the reflective element 21, the light pattern adjustment element 22, and the collimating lens 23, a critical value of a light emission angle θ1, θ2 of a light emitted by each of the first light-emitting units 12A through the light-emitting surface SA thereof is within a range from 80 degrees to 150 degrees, and a critical value of a light emission angle θ1, θ2 of a light emitted by each of the second light-emitting units 12B through the light-emitting surface SB thereof is within a range from 80 degrees to 150 degrees. θ1 represents a minimum emission angle threshold value, and θ2 represents a maximum emission angle threshold value. Furthermore, an incident angle between the first light source and the curved surface CS is less than or equal to ½ of the light emission angle (i.e., 75 degrees), and an incident angle between the second light source and the curved surface CS is less than or equal to ½ of the light emission angle (i.e., 75 degrees).

BENEFICIAL EFFECTS OF THE EMBODIMENT

In conclusion, in the integrated dual-color vehicle light device provided by the present disclosure, by virtue of "a minimum separation distance being defined between the light-emitting surfaces of any two adjacent ones of the light-emitting units, and the minimum separation distance being less than or equal to 0.3 millimeters," "the chromaticity of the first light source being within a first chromaticity region of a CIE-xy chromaticity diagram, and the chromaticity of the second light source being within a second chromaticity region of the CIE-xy chromaticity diagram," and "the vehicle light optical assembly being configured to reflect or refract the first light source and the second light source of the light-emitting units, so that the first light source and the second light source are configured to respectively produce a first light path region and a second light path region via the vehicle light optical assembly, and the first light path region overlaps with the second light path region by at least 70% or more," the integrated dual-color vehicle light device can selectively emit lights of two different chromaticities (i.e., white light and amber light) that comply with safety regulations, and can also ensure light of any chromaticity to be emitted at the maximum irradiation brightness that is achievable for a vehicle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An integrated dual-color vehicle light device, comprising:
   a vehicle light source module including:
      a substrate; and
      a plurality of light-emitting units disposed on the substrate and spaced apart from each other, wherein each of the light-emitting units has a light-emitting surface, a minimum separation distance is defined between the light-emitting surfaces of any two adjacent ones of the light-emitting units, and the minimum separation distance is less than or equal to 0.3 millimeters, and wherein certain ones of the light-emitting units are configured to jointly emit a first light source, and other ones of the light-emitting units are configured to jointly emit a second light source;
   wherein a chromaticity of the first light source is different from a chromaticity of the second light source, wherein the chromaticity of the first light source is within a first chromaticity region of a CIE-xy chromaticity diagram, and the first chromaticity region is a region enclosed by a plurality of functional straight lines of X=0.31, Y=0.44, X=0.5, Y=0.38, Y=0.15+0.64X, and Y=0.05+0.75X, and wherein the chromaticity of the second light source is within a second chromaticity region of the CIE-xy chromaticity diagram, and the second chromaticity region is a region enclosed by a plurality of functional straight lines of Y=1.290X−0.1, Y=0.138+0.58X, Y=0.44, and Y=0.94−X; and
   a vehicle light optical assembly disposed on one side of the vehicle light source module, wherein the vehicle light optical assembly is configured to reflect or refract the first light source and the second light source of the light-emitting units, so that the first light source and the second light source are configured to respectively produce a first light path region and a second light path region via the vehicle light optical assembly, and the first light path region overlaps with the second light path region by at least 70% or more;
   wherein the vehicle light optical assembly includes a collimating lens, wherein the vehicle light optical assembly is configured to emit light through the collimating lens using the first light source and the second light source, and wherein a light transmittance of the collimating lens is within a range from 85% to 95%, and a refractive index of the collimating lens is within a range from 1.3 to 1.6.

2. The integrated dual-color vehicle light device according to claim 1, wherein the certain ones of the light-emitting units are each defined as a first light-emitting unit and capable of emitting a first light beam; wherein a top surface of each of the first light-emitting units is the light-emitting surface, the first light-emitting units are configured to emit the first light beam via the light-emitting surface, and the first light beams are each defined as white light and configured to jointly form the first light source; wherein the other ones of the light-emitting units are each defined as a second light-emitting unit and capable of emitting a second light beam; wherein a top surface of each of the second light-emitting units is the light-emitting surface, the second light-emitting units are configured to emit the second light beam via the light-emitting surface, and the second light beams are each defined as amber light and configured to jointly form the second light source.

3. The integrated dual-color vehicle light device according to claim 2, wherein the vehicle light optical assembly has a length direction and a width direction that is perpendicular to the length direction; wherein the first light-emitting units are arranged on one of two sides of the substrate along the width direction, and the second light-emitting units are arranged on another one of the two sides of the substrate along the width direction.

4. The integrated dual-color vehicle light device according to claim 2, wherein a critical value of a light emission angle of a light emitted by each of the first light-emitting units through the light-emitting surface thereof is within a range from 80 degrees to 150 degrees, and a critical value of a light emission angle of a light emitted by each of the second light-emitting units through the light-emitting surface thereof is within a range from 80 degrees to 150 degrees.

5. The integrated dual-color vehicle light device according to claim 1, wherein the certain ones of the light-emitting units are each defined as a first light-emitting unit and capable of emitting a first light beam; wherein a top surface of each of the first light-emitting units is the light-emitting surface, the first light-emitting units are configured to emit the first light beam via the light-emitting surface, and the first light beams are each defined as white light; wherein certain ones of the first light beams are configured to jointly form the first light source; wherein the other ones of the light-emitting units are each defined as a second light-emitting unit and capable of emitting a second light beam; wherein a top surface of each of the second light-emitting units is the light-emitting surface, the second light-emitting units are configured to emit the second light beam via the light-emitting surface, and the second light beams are each defined as amber light; wherein the second light beams are configured to cooperate with at least one of the first light beams and jointly form the second light source.

6. The integrated dual-color vehicle light device according to claim 5, wherein the vehicle light optical assembly has a length direction and a width direction that is perpendicular to the length direction; wherein the first light-emitting units are arranged on one of two sides of the substrate along the width direction, and the second light-emitting units are arranged on another one of the two sides of the substrate along the width direction.

7. The integrated dual-color vehicle light device according to claim 5, wherein a critical value of a light emission angle of a light emitted by each of the first light-emitting units through the light-emitting surface thereof is within a range from 80 degrees to 150 degrees, and a critical value of a light emission angle of a light emitted by each of the second light-emitting units through the light-emitting surface thereof is within a range from 80 degrees to 150 degrees.

8. The integrated dual-color vehicle light device according to claim 1,
wherein the vehicle light optical assembly includes:
a reflective element having a curved surface, wherein a region defined by orthogonally projecting the curved surface toward the substrate covers a region defined by orthogonally projecting the light-emitting units toward the substrate, so that the first light source and the second light source are reflected by the reflective element; and
a light pattern adjustment element disposed on one side of the substrate, wherein a portion of the light pattern adjustment element is covered by the region defined by orthogonally projecting the curved surface toward the substrate, and the light pattern adjustment element is configured to partially block the first light source and the second light source reflected by the reflective element;
wherein the collimating lens is located on a side of the light pattern adjustment element away from the vehicle light source module, wherein a path defined by orthogonally projecting the collimating lens toward the reflective element covers the light pattern adjustment element and the vehicle light source module, and the collimating lens is configured to refract the first light source and the second light source reflected by the light reflective element.

9. The integrated dual-color vehicle light device according to claim 8, wherein a cross-section of the light pattern adjustment element is in a C-shape, and has a center of curvature; wherein the center of curvature is located on a side of the light pattern adjustment element that faces toward the collimating lens.

10. The integrated dual-color vehicle light device according to claim 8, wherein an incident angle between the first light source and the curved surface is less than or equal to 75 degrees, and an incident angle between the second light source and the curved surface is less than or equal to 75 degrees.

11. The integrated dual-color vehicle light device according to claim 8, wherein an aluminum plating layer is disposed on the curved surface of the reflective element, and a reflectivity of the aluminum plating layer is within a range from 80% to 90%.

* * * * *